US012377457B2

(12) United States Patent
Liu et al.

(10) Patent No.: US 12,377,457 B2
(45) Date of Patent: Aug. 5, 2025

(54) BEARING BLOCK UNIT AND USE THEREOF

(71) Applicant: Aktiebolaget SKF, Gothenburg (SE)

(72) Inventors: Jiakai Liu, Shanghai (CN); Xiaofeng Xu, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 22 days.

(21) Appl. No.: 17/207,704

(22) Filed: Mar. 21, 2021

(65) Prior Publication Data
US 2021/0331233 A1    Oct. 28, 2021

(30) Foreign Application Priority Data

Apr. 26, 2020    (CN) .......................... 202010337299.5

(51) Int. Cl.
*B22D 11/128*    (2006.01)
*F16C 13/02*    (2006.01)

(52) U.S. Cl.
CPC .......... *B22D 11/1287* (2013.01); *F16C 13/02* (2013.01); *F16C 2322/00* (2013.01)

(58) Field of Classification Search
CPC ........ B22D 11/128; F16C 13/02; F16C 33/58; F16C 33/60; F16C 13/04; F16C 33/30; F16C 33/581
See application file for complete search history.

(56) References Cited

U.S. PATENT DOCUMENTS

| 3,965,974 A | * | 6/1976 | Sernetz | F16C 13/02 384/321 |
| 4,326,759 A | * | 4/1982 | Rasmus | F16C 19/55 384/494 |
| 5,186,547 A | * | 2/1993 | Muhl | F16C 33/80 384/480 |
| 5,287,623 A | * | 2/1994 | Francis | F16C 33/60 384/570 |
| 5,630,669 A | * | 5/1997 | Stewart | F16C 33/504 384/570 |

(Continued)

FOREIGN PATENT DOCUMENTS

| AT | 521218 A1 | * 11/2019 | ......... B22D 11/1287 |
| CN | 201121651 Y | 9/2008 | |

(Continued)

*Primary Examiner* — Keith Walker
*Assistant Examiner* — Jacky Yuen
(74) *Attorney, Agent, or Firm* — GARCIA-ZAMOR INTELLECTUAL PROPERTY LAW, LLC; Ruy Garcia-Zamor

(57) ABSTRACT

A bearing block unit for supporting a continuous casting roll, including a bearing block and a roller bearing disposed inside the bearing block. The bearing provides an inner ring raceway, an outer ring raceway, and at least one row of rolling bodies disposed between the inner and outer ring raceways. The inner ring raceway is formed by a complete and continuous independent inner ring. The inner ring is fitted on a roll shaft of the continuous casting roll during installation, for the purpose of supporting the continuous casting roll. The outer ring raceway is at least partially formed by processing of an inner surface of an inner hole of the bearing block. The present invention also relates to a continuous casting roll line and a continuous casting machine using the bearing block unit.

15 Claims, 3 Drawing Sheets

(56) References Cited

U.S. PATENT DOCUMENTS

| | | | | |
|---|---|---|---|---|
| 5,649,889 A | * | 7/1997 | Warner, III | ............ F16C 13/02 |
| | | | | 164/448 |
| 5,971,622 A | | 10/1999 | Akazawa | |
| 2013/0129270 A1 | | 5/2013 | Takahashi | |

FOREIGN PATENT DOCUMENTS

| CN | 101842605 A | | 9/2010 |
|---|---|---|---|
| DE | 10309829 A1 | | 12/2003 |
| GB | 2388166 A | | 11/2003 |
| JP | 2001340947 A | * | 12/2001 |
| JP | 2007-40519 A | | 2/2007 |
| JP | 2008-57739 A | | 3/2008 |
| JP | 2015021580 A | | 2/2015 |

* cited by examiner

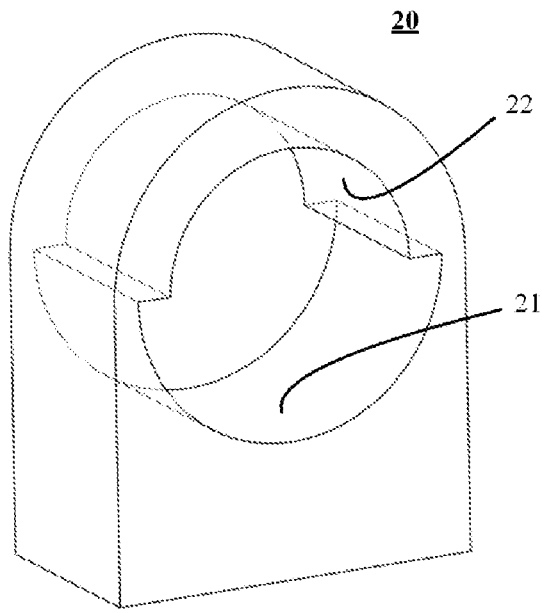
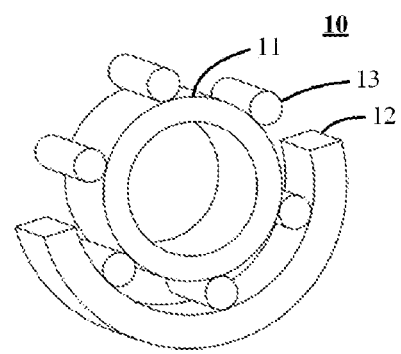
Fig. 3A Fig. 3B
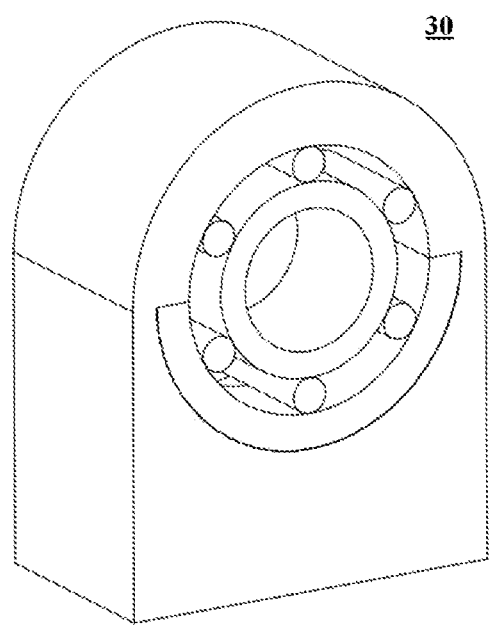
Fig. 3C

BEARING BLOCK UNIT AND USE THEREOF

CROSS-REFERENCE TO RELATED APPLICATIONS

This application claims priority to Chinese Patent Application no. 202010337299.5, filed Apr. 26, 2020, the contents of which is fully incorporated herein by reference.

TECHNICAL FIELD

The present invention relates to a bearing block unit, and a continuous casting roll line and continuous casting machine (continuous caster) using the bearing block unit.

BACKGROUND OF THE INVENTION

The harsh operating conditions of a continuous casting machine put exacting demands on the load-bearing capacity, non-centred running ability and high-temperature tolerance of bearings. Taking high temperature as an example, in a continuous casting roll line 1000 as shown in FIG. 1, the side of a bearing block 30 that is close to a steel billet (located at the top side thereof in the figure, hereinafter referred to as the "top end") is very close to the red-hot steel billet; consequently, a bearing and sealing member in the interior thereof are very easily damaged, and at the same time, the high temperature also accelerates the ageing of lubricating grease inside the bearing.

A water cooling channel 23 is provided inside the top end, as shown in FIG. 2, with the aim of lowering the temperature inside the bearing block by means of water circulation; however, limited by the overall radial size of the bearing block (which if too large is likely to touch the steel billet and be damaged), the radial size of the water cooling channel likewise cannot be made too large, with the result that the cooling effect is not ideal, and a bearing assembly in the bearing block remains under the influence of the heat effect of the steel billet. If, for this reason, the radial size of the water cooling channel is increased to take up part of (compress) the radial size of the bearing, this will result in a drop in the load-bearing capacity of the bearing.

The above predicament is a major reason for bearing failure in practice, and has for a long time perplexed production and maintenance departments in the metallurgical industry. Reality calls for a solution that can adapt to the harsh operating conditions of a continuous casting process, and thereby ensure that the bearings and roll line can operate reliably for a long time.

SUMMARY OF THE INVENTION

In order to solve the above technical problem, the present invention provides a bearing block unit for a continuous casting roll line, comprising a bearing block and a roller bearing disposed in the bearing block. The roller bearing comprises an inner ring raceway, an outer ring raceway, and at least one row of rolling bodies disposed between the inner and outer ring raceways. The inner ring raceway is formed by a complete and continuous independent inner ring, wherein the inner ring may be a single row or multiple rows. In a running state, the inner ring fitted onto a roll shaft of a continuous casting roll is configured to support the continuous casting roll. The outer ring raceway is at least partially formed by processing of an inner surface of the bearing block.

The formation of the outer ring raceway from the inner surface of the bearing block means that an independent bearing outer ring is omitted. If the radial size of the bearing block remains unchanged, the internal space of the bearing block that is transferred by omitting the independent outer ring can not only be used to increase the radial size of a water cooling channel, but can also be used to increase the radial size of the rolling bodies of the bearing, or to achieve both of these objectives at the same time, while also being used to increase the ability of the bearing block unit to adapt to high temperatures as well as the load-bearing capacity of the bearing in the block.

Based on the bearing block unit described above, the present invention also provides a continuous casting roll line. The roll line is formed by at least one segment of continuous casting roll, each segment of continuous casting roll comprising a corresponding roll shaft and a roll mantle formed on the roll shaft, and being supported on a roll line support (not shown) by means of the bearing block unit. The present invention also provides a continuous casting machine, comprising the continuous casting roll line described above.

By using the bearing block unit according to the present invention, the continuous casting roll line and continuous casting machine can attain higher load-bearing capacity and/or ability to adapt to high temperatures, thus having the advantages of reduced maintenance frequency and reduced operating costs.

DESCRIPTION OF THE ACCOMPANYING DRAWINGS

FIG. 3A is schematic assembly drawing of the bearing block unit in one embodiment.

FIG. 3B is schematic assembly drawing of the bearing block unit in the same embodiment.

FIG. 3C is schematic assembly drawing of the bearing block unit in the same embodiment.

DETAILED DESCRIPTION OF THE INVENTION

Figure 1:
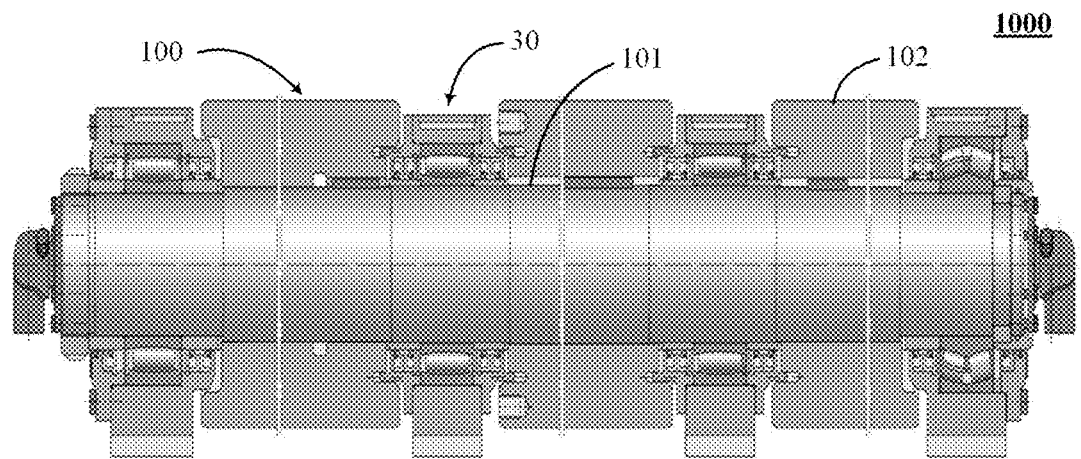
FIG. 1 is a structural schematic drawing of a continuous casting roll line.
Figure 2:
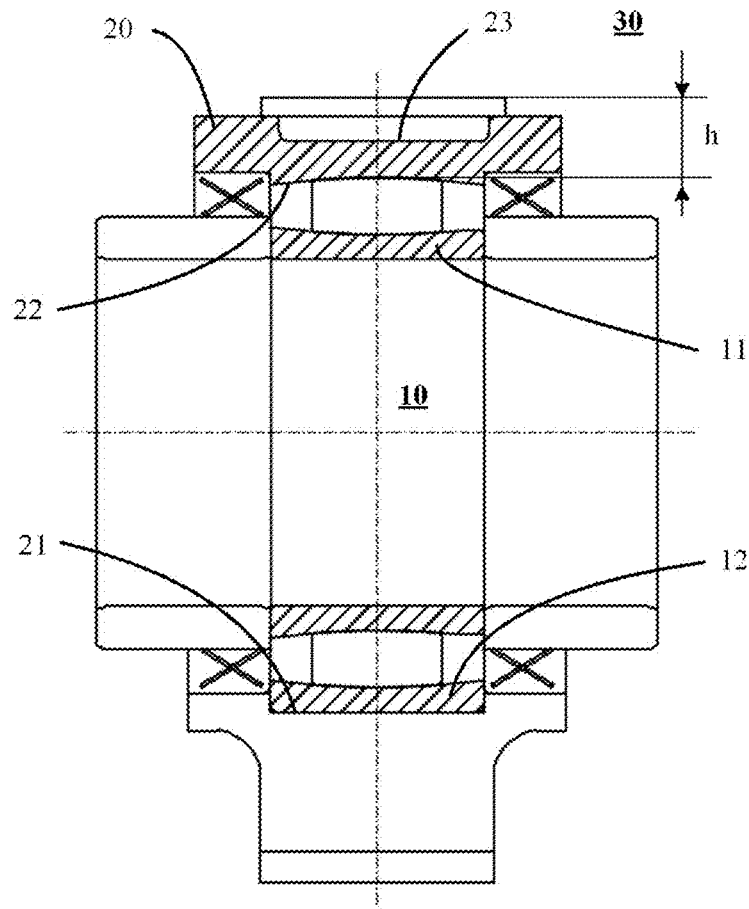
FIG. 2 is a (partial) sectional schematic drawing of the bearing block unit.

FIG. 2 and FIGS. 3A, 3B and 3C show a sectional schematic drawing and schematic assembly drawings respectively of the bearing block unit of the present invention. In a bearing block unit 30 shown in the figures, a complete bearing 10 previously installed in a bearing block 20 only has an independent outer ring 12 present on a partial circumference. After installation, the independent outer ring 12 is situated in an inner hole of the bearing block 20, at least covering a circumferential region 21 of the bearing that is configured to bear a main radial load (hereinafter referred to as "load-bearing zone"). In another circumferential region other than the independent outer ring 12 (hereinafter referred to as "non-load-bearing zone"), an outer ring raceway is formed by a partial inner surface 22 of the bearing block inner hole, and this combines with an outer ring raceway formed on the independent outer ring 12 fitted in the load-bearing zone 21 to form a complete (360°) bearing outer ring raceway.

The load-bearing zone is a main region of the bearing block inner hole and the bearing fitted therein, configured to bear a pressing load and a gravity load in the respective circumferential directions thereof when a steel billet passes a roll line; the position and range of distribution of this partial region in the circumferential direction is related to an upstream/downstream position of the roll line in a production line and an installation angle of the bearing block (the installation angle determines the attitude of inclination). The non-load-bearing zone is another circumferential region other than the load-bearing zone, and the loads borne are different due to the angles of inclination of the bearing block being different (for example, when there is no steel billet passing, a non-load-bearing zone of the roll line above only bears the roll line's own weight); compared with the load-bearing zone that simultaneously bears the steel billet's pressing load and the steel billet's weight load, the radial load borne by the non-load-bearing zone is much less.

To adapt to different ranges of distribution of the load-bearing zone, the independent outer ring 12 may cover 30%-70% of the circumferential range of the bearing, or further cover ⅓-⅗ of the circumferential range of the bearing, or further cover about 50% of the circumferential range of the bearing.

In a running state, rolling bodies 13 run in the bearing outer ring raceway formed by the non-load-bearing zone 22 and the independent outer ring 12. The outer ring raceway located in the non-load-bearing zone 22 mainly serves to guide the rolling bodies, without bearing the main radial load, thus the technical requirements for the outer ring raceway are not high; ordinary steel and processing technology can meet the requirements. With regard to the independent outer ring that bears the main radial load, this can be obtained directly by splitting a standard bearing outer ring, thus neither the manufacturing cost nor the processing difficulty are high.

It is pointed out in passing that a seam will be formed between the independent outer ring raceway and the outer ring raceway formed on the inner surface of the bearing block inner hole, thus a transition region is formed between the load-bearing zone and non-load-bearing zone. Since the transition region does not bear the main radial load of the bearing, the rolling bodies will not be damaged when passing the transition region.

Figures 4A, 4B:
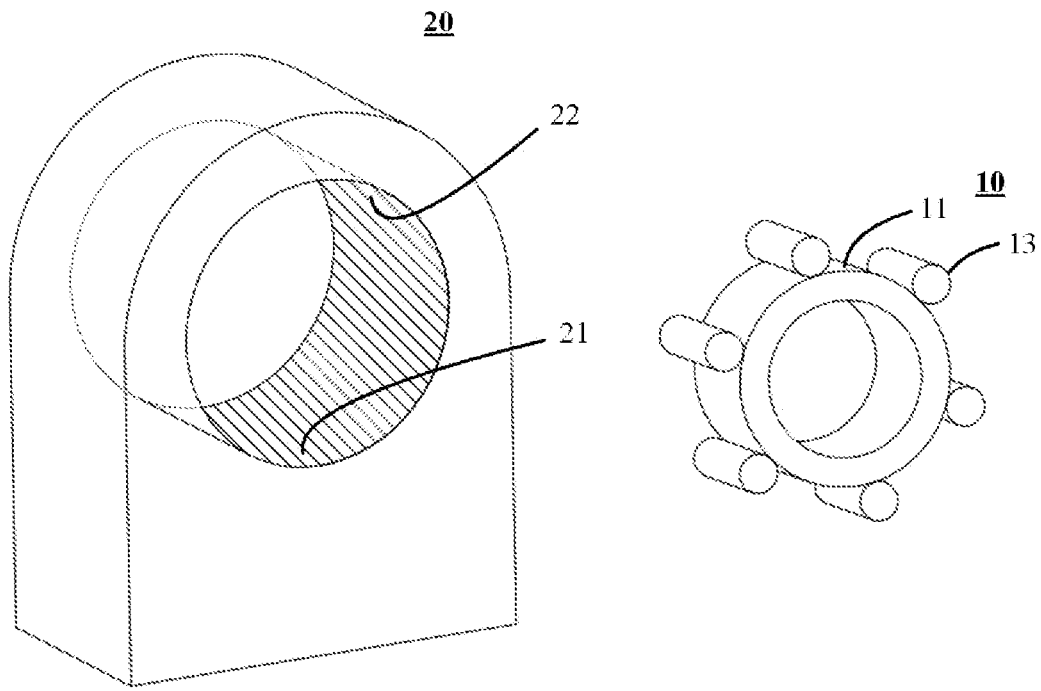
FIG. 4A is schematic assembly drawings of the bearing block unit in a second embodiment.
FIG. 4B is a schematic assembly drawing of the bearing block unit in the second embodiment.
Figure 4C:
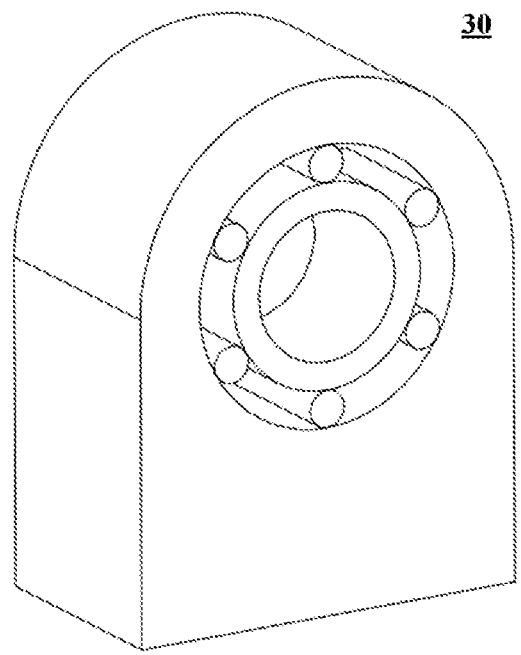
FIG. 4C is a schematic assembly drawing of the bearing unit in the second embodiment.

FIGS. 4A, 4B and 4C shows another embodiment of the present invention, showing how a bearing outer ring raceway is formed completely by an inner surface 22 of a bearing block 20, thus there is no need for a separate outer ring 12. Since a load-bearing zone 21 still needs to bear the main radial load of the bearing, the outer ring raceway at this place needs to meet sufficiently high bearing performance requirements. In this case, the bearing block 20 may as a whole be formed using bearing steel or a material of higher performance, and a surface of an inner hole thereof is subjected to outer ring raceway technological processing, thereby meeting the requirements of the roll line for bearing performance. In this case, the bearing need not be provided with an independent outer ring.

It can be seen from the above description that by providing an independent bearing outer ring in a partial circumferential range, and forming an outer ring raceway from a surface of a bearing block inner hole in the remaining range, a complete bearing outer ring raceway can be formed at an inner surface of the bearing block. The structure described above can transfer a radial size corresponding to the radial thickness of a solid outer ring by omitting (in particular) a bearing solid outer ring in the non-load-bearing zone, while keeping the radial size of the bearing block unchanged, thereby making up the deficiency in radial size h at the top end of the bearing block (see FIG. 2).

The radial size h thus transferred can not only be used to increase the radial size of a water cooling channel 23 provided inside the top end, thereby improving a cooling effect, but can also be used to increase the radial size of bearing rolling bodies, thereby increasing the load-bearing capacity of the rolling bodies and even the entire bearing. Of course, it is also possible to achieve both of the above objectives at the same time, thus obtaining a double technical effect of improved cooling and increased load-bearing capacity at the same time.

Unlike the partial provision of a solid outer ring, the present invention uses a continuous and complete inner ring design, such that the inner ring has an uninterrupted annular structure. Since the inner ring is always in a rotating state when the bearing is running, any position thereof in the circumferential direction must cycle past the load-bearing zone, and thus must continuously withstand the ordeal of the main radial load of the bearing. In such circumstances, any structural flaw in the inner ring, such as a raceway seam, will be extremely damaging to the raceway and the rolling bodies. Thus, the present invention avoids using a split inner ring design (e.g. with two partial components being joined together to form a 360° complete inner ring), despite the fact that a split inner ring could enable the inner ring components to be conveniently fitted onto a roll shaft by being brought together (not shown in the figures), thereby avoiding the inconvenience associated with roll shafts 101 being passed one by one through an inner ring 11 and a roll mantle 102. In other words, the complete and continuous inner ring structure can ensure that the rolling bodies run without damage on a seamless inner ring raceway.

It is necessary to point out that "complete and continuous inner ring" means that the inner ring is continuous and uninterrupted through 360° in the circumferential direction, and this is unrelated to whether it employs a split structure in the axial direction. As shown in FIG. 1, the inner ring may employ a single-row inner ring structure, or a parallel-row (with two or more rows) inner ring structure and/or raceway distribution.

As stated above, the radial space inside the bearing block that is transferred by the omitted solid outer ring may be used to improve cooling and/or increase the load-bearing capacity of the bearing. Thus, a bearing block unit employing the bearing structure described above can extend the service life of the bearing to the maximum extent, thereby reducing the maintenance frequency of the continuous casting roll line and the manufacturing cost of a product.

Based on the bearing block unit 30 described above, the present invention also provides a continuous casting roll 100, comprising a roll shaft 101 and a roll mantle 102 formed on the roll shaft; the roll shaft 101 passes through the bearing inner ring 11 and is supported on the bearing block 20.

The bearing block unit described above is suitable for continuous casting rolls and continuous casting roll lines of all types, regardless of whether they are of a through-shaft type or a segmented type. "Through-shaft type" means that the roll shaft as a whole passes through all of the bearings and roll mantles of the continuous casting roll line; the segmented type comprises multiple roll shaft segments, each roll shaft segment only passing through the roll mantle corresponding to the position thereof or being integrally formed with the roll mantle.

Those skilled in the art should understand that the method of the present invention is not restricted by particular embodiments. Any changes or improvements to the present invention which comply with the definitions in the attached claims shall be included in the scope of protection of the present invention.

The invention claimed is:

1. A bearing block unit for supporting a continuous casting roll, comprising:
   a one-piece bearing block forming a partial inner surface extending a first, non-zero distance circumferentially, and
   a roller bearing disposed in an inner hole of the bearing block, the bearing comprising an inner ring raceway, an independent outer ring extending a second, non-zero distance circumferentially, and at least one set of rolling bodies disposed between the inner ring raceway and an outer ring raceway, wherein
   the inner ring raceway is formed by at least one row of a complete and continuous independent inner ring, the inner ring being fitted around a roll shaft of the continuous casting roll during installation, for the purpose of supporting the continuous casting roll, and wherein
   the partial inner surface and the independent outer ring delimit the outer ring raceway, the first and second non-zero distances extending the full circumference of the outer ring raceway,
   wherein the independent outer ring accounts for 30%-70% of the circumference of the bearing.

2. The bearing block unit according to claim 1, wherein the outer ring raceway is formed by joining together bearing raceways formed by the independent outer ring in a load-bearing zone and the bearing block partial inner surface in a non-load-bearing zone.

3. The bearing block unit according to claim 2, wherein the independent outer ring accounts for one third ($\frac{1}{3}$) of the circumference of the bearing.

4. The bearing block unit according to claim 2, wherein the independent outer ring accounts for three fifths ($\frac{3}{5}$) of the circumference of the bearing.

5. The bearing block unit according to claim 4, wherein the independent outer ring is formed by splitting a bearing outer ring of a standard bearing.

6. A continuous casting roll line, formed by at least one segment of a continuous casting roll, each segment of the continuous casting roll comprising:
   a roll shaft, and
   a roll mantle formed on the roll shaft, wherein the continuous casting roll line is supported on a bearing block unit comprising:
      a one-piece bearing block forming a partial inner surface extending a first, non-zero distance circumferentially, and
      a roller bearing disposed in an inner hole of the bearing block, the bearing comprising an inner ring raceway, an independent outer ring extending a second, non-zero distance circumferentially, and at least one set of rolling bodies disposed between the inner ring raceway and an outer ring raceway, wherein
      the inner ring raceway is formed by at least one row of a complete and continuous independent inner ring, the inner ring being fitted around the roll shaft of the continuous casting roll during installation, for the purpose of supporting the continuous casting roll, and wherein
      the partial inner surface and the independent outer ring delimit the outer ring raceway, the first and second non-zero distances extending the full circumference of the outer ring raceway,
   wherein the independent outer ring accounts for 30%-70% of the circumference of the bearing.

7. The continuous casting roll line according to claim 6, wherein the outer ring raceway is formed by joining together bearing raceways formed by the independent outer ring in a load-bearing zone and the bearing block partial inner surface in a non-load-bearing zone.

8. The bearing block unit according to claim 7, wherein the independent outer ring accounts for one third ($\frac{1}{3}$) of the circumference of the bearing.

9. The continuous casting roll line according to claim 7, wherein the independent outer ring accounts for three fifths ($\frac{3}{5}$) of the circumference of the bearing.

10. The continuous casting roll line according to claim 9, wherein the independent outer ring is formed by splitting a bearing outer ring of a standard bearing.

11. A continuous casting machine, comprising:
    a continuous casting roll line, formed by at least one segment of a continuous casting roll, each segment of the continuous casting roll comprising:
    a roll shaft, and
    a roll mantle formed on the roll shaft, wherein the continuous casting roll line is supported on a bearing block unit comprising:
       a one-piece bearing block forming a partial inner surface extending a first, non-zero distance circumferentially, and
       a roller bearing disposed in an inner hole of the bearing block, the bearing comprising an inner ring raceway, an independent outer ring extending a second, non-zero distance circumferentially, and at least one set of rolling bodies disposed between the inner raceway and an outer ring raceway, wherein
       the inner ring raceway is formed by at least one row of a complete and continuous independent inner ring, the inner ring being fitted around the roll shaft of the continuous casting roll during installation, for the purpose of supporting the continuous casting roll, and wherein
       the partial inner surface and the independent outer ring delimit the outer ring raceway, the first and second non-zero distances extending the full circumference of the outer ring raceway,
    wherein the independent outer ring accounts for 30%-70% of the circumference of the bearing.

12. The continuous casting machine according to claim 11, wherein the outer ring raceway is formed by joining together bearing raceways formed by the independent outer ring in a load-bearing zone and the bearing block partial inner surface in a non-load-bearing zone.

13. The bearing block unit according to claim 12, wherein the independent outer ring accounts for one third ($\frac{1}{3}$) of the circumference of the bearing.

14. The continuous casting machine according to claim 12, wherein the independent outer ring accounts for three-fifths ($\frac{3}{5}$) of the circumference of the bearing.

15. The continuous casting machine according to claim 14, wherein the independent outer ring is formed by splitting a bearing outer ring of a standard bearing.

* * * * *